US008687872B2

(12) United States Patent
Engelbart et al.

(10) Patent No.: US 8,687,872 B2
(45) Date of Patent: *Apr. 1, 2014

(54) METHOD FOR REMOTE REWORK IMAGING FOR PART INCONSISTENCIES

(75) Inventors: Roger W. Engelbart, St. Louis, MO (US); Richard J. Steckel, Washington, MO (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/334,512

(22) Filed: Dec. 22, 2011

(65) Prior Publication Data

US 2012/0093391 A1    Apr. 19, 2012

Related U.S. Application Data

(63) Continuation of application No. 12/103,178, filed on Apr. 15, 2008, now Pat. No. 8,094,921.

(51) Int. Cl.
*G06K 9/03* (2006.01)
(52) U.S. Cl.
USPC .......................................................... 382/141
(58) Field of Classification Search
USPC ................ 356/237.1–237.2; 382/141; 156/64
See application file for complete search history.

(56) References Cited

U.S. PATENT DOCUMENTS

| 7,236,625 | B2 | 6/2007 | Engelbart et al. |
| 7,463,368 | B2 | 12/2008 | Morden et al. |
| 7,480,037 | B2 | 1/2009 | Palmateer et al. |
| 7,489,392 | B2 | 2/2009 | Engelbart et al. |
| 7,495,758 | B2 | 2/2009 | Walton |
| 7,508,971 | B2 | 3/2009 | Vaccaro et al. |
| 7,587,080 | B1 | 9/2009 | Good |
| 7,626,692 | B2 | 12/2009 | Engelbart et al. |
| 8,094,921 | B2 * | 1/2012 | Engelbart et al. ............. 382/141 |
| 2005/0121422 | A1 * | 6/2005 | Morden et al. ............. 219/121.6 |
| 2005/0276466 | A1 * | 12/2005 | Vaccaro et al. ............... 382/152 |
| 2007/0034313 | A1 | 2/2007 | Engelbart et al. |
| 2007/0127015 | A1 * | 6/2007 | Palmateer et al. .......... 356/237.1 |
| 2008/0055591 | A1 * | 3/2008 | Walton ....................... 356/237.1 |

OTHER PUBLICATIONS

Non-final office action dated May 25, 2011 regarding U.S. Appl. No. 12/103,178, 13 pages.
Notice of allowance dated Sep. 28, 2011 regarding U.S. Appl. No. 12/103,178, 8 pages.
Engelbart, "Method and Apparatus for Reworking Inconsistencies on Parts," USPTO U.S. Appl. No. 13/480,984, filed May 25, 2012, 74 pages.

* cited by examiner

*Primary Examiner* — Kara E Geisel
(74) *Attorney, Agent, or Firm* — Yee & Associates, P.C.

(57) ABSTRACT

A method for remote rework imaging a part for an inconsistency is provided. The part is scanned with a nondestructive inspection device. An image of a part inconsistency is communicated from the nondestructive inspection device to a programmable device. The image of the part inconsistency is viewed with the programmable device. The image of the part inconsistency is edited with the programmable device using an input device in communication with the programmable device. The edited image is communicated from the programmable device to a visible light projector. The edited image is projected onto the part inconsistency using the visible light projector.

14 Claims, 9 Drawing Sheets

METHOD FOR REMOTE REWORK IMAGING FOR PART INCONSISTENCIES

This application is a continuation of application Ser. No. 12/103,178, filed Apr. 15, 2008, now U.S. Pat. No. 8,094,921, issued on Jan. 10, 2012.

BACKGROUND INFORMATION

1. Field

The present disclosure is generally related to a method and system for remote rework imaging for part inconsistencies. The disclosure has particular utility in connection with rework of composite parts and structures found in vehicles, including, but not limited to aircraft, auto, truck, bus, train, ship or satellite and will be described in connection with such utility, although other utilities are contemplated.

2. Background

A wide variety of nondestructive evaluation methods (nondestructive inspection), such as ultrasonics, eddy current, x-ray, magnetic resonance, and microwave, have been utilized to inspect post-manufacture parts, which may comprise metal and/or composite and/or ceramic parts or other types of parts. Both water based, gantry style systems and portable instruments have been utilized to conduct this evaluation. Some of the prior art methods conduct scans of the post-manufacture parts, and then print out full-scale paper plots of the parts or the inconsistency areas, which are then aligned over the parts in order to rework the inconsistencies. Sometimes, the inconsistency areas of the printed plot are cut out in order to trace the inconsistencies on the parts. Other methods overlay the printed plot with a transparent Mylar sheet in order to trace the outlines of any inconsistencies on the Mylar, which is then laid over the part in order to trace the inconsistencies onto the part for rework of the inconsistencies. One or more of these methods may be costly, may take substantial time, may be difficult to administer, may be inefficient, may be inconsistent, may lead to error, may not allow for repeatability, and/or may experience other types of problems.

Further, for the rework to be made, one or more engineers frequently need to review the plotted inconsistency and develop a plan to rework the part, to remove or diminish the inconsistencies. Once the plan is developed, the engineer(s) join one or more technicians and explain to the technicians how the inconsistencies should be reworked. This method of resolving inconsistencies requires engineers to be on site in any manufacturing site at which rework of inconsistencies may occur. Sometimes the engineer will plot the rework (e.g., injection hole locations) on the same paper or other surface on which the inconsistency is plotted. The technician will attempt to use that plotted rework to carry out the rework. However, if the plot is not properly aligned on the part, the inconsistency will be incorrectly reworked.

SUMMARY

The present disclosure provides a system and method for remote rework imaging of a part for an inconsistency. In one embodiment, the system contains a nondestructive inspection device. A programmable device for viewing and editing images is provided in communication with the nondestructive inspection device. An image of the part inconsistency is communicated from the nondestructive inspection device and editable or capable of editing on the programmable device. An input device is provided in communication with the programmable device for editing images on the programmable device. A laser projector is provided in communication with the programmable device to project an edited image from the projector onto the part at the location of the inconsistency.

The present disclosure also provides a method of remote rework imaging of a part for an inconsistency. One embodiment broadly comprises the following steps: scanning the part for an inconsistency with a nondestructive inspection device; communicating an image of the part inconsistency from the nondestructive inspection device to a programmable device; viewing the image of the part inconsistency with the programmable device; editing the image of the part inconsistency with the programmable device using an input device in communication with the programmable device; and projecting the edited image onto the part inconsistency using a visible light projector.

The features, functions, and advantages that have been discussed can be achieved independently in various embodiments of the present disclosure or may be combined in yet other embodiments further details of which can be seen with reference to the following description and drawings.

Other systems, methods, features, and advantages of the present disclosure will be or become apparent upon examination of the following drawings and detailed description. It is intended that all such additional systems, methods, features, and advantages be included within this disclosure.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
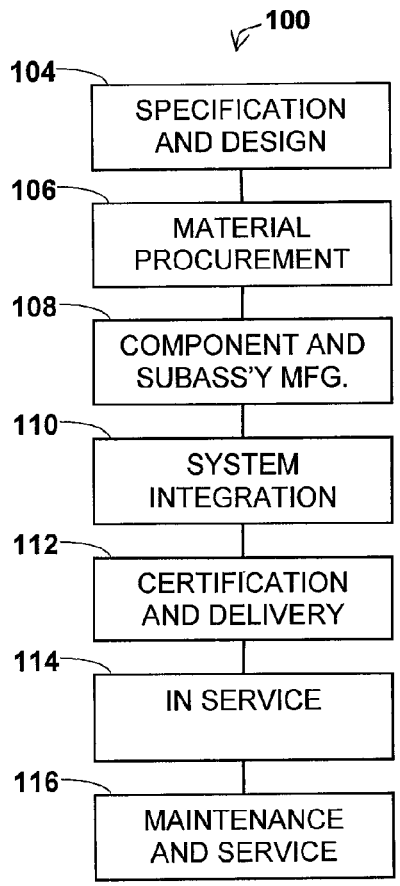
FIG. 1 is a flow diagram of aircraft production and service methodology.
Figure 2:
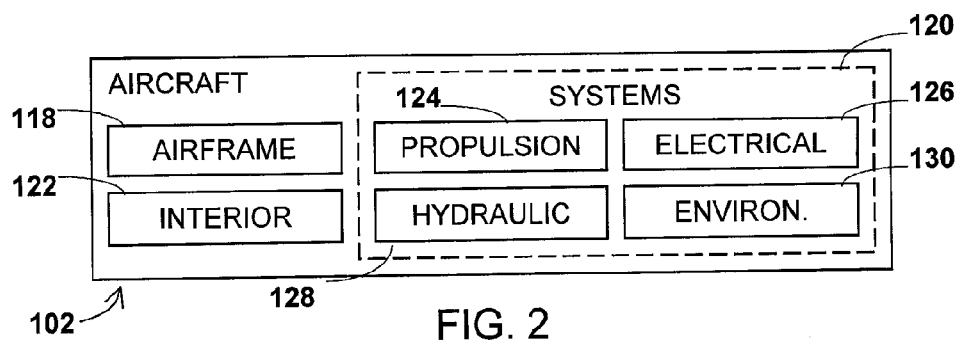
FIG. 2 is a block diagram of an aircraft.

Referring more particularly to the drawings, embodiments of the disclosure may be described in the context of an aircraft manufacturing and service method 100 as shown in FIG. 1 and an aircraft 102 as shown in FIG. 2. During pre-production, exemplary method 100 may include specification and design 104 of the aircraft 102 and material procurement 106. During production, component and subassembly manufacturing 108 and system integration 110 of the aircraft 102 takes place. Thereafter, the aircraft 102 may go through certification and delivery 112 in order to be placed in service 114. While in service by a customer, the aircraft 102 is scheduled for routine maintenance and service 116 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 2, the aircraft 102 produced by exemplary method 100 may include an airframe 118 with a plurality of systems 120 and an interior 122. Examples of high-level systems 120 include one or more of a propulsion system 124, an electrical system 126, a hydraulic system 128, and an environmental system 130. Any number of other systems may be included. Although an aerospace example is shown, the principles of the invention may be applied to other industries, such as the automotive industry.

Apparatus and methods embodied herein may be employed during any one or more of the stages of the production and service method 100. For example, components or subassemblies corresponding to production process 108 may be fabricated or manufactured in a manner similar to components or subassemblies produced while the aircraft 102 is in service. Also, one or more apparatus embodiments, method embodiments, or a combination thereof may be utilized during the production stages 108 and 110, for example, by substantially expediting assembly of or reducing the cost of an aircraft 102. Similarly, one or more of apparatus embodiments, method embodiments, or a combination thereof may be utilized while the aircraft 102 is in service, for example and without limitation, to maintenance and service 116.

Figure 3:
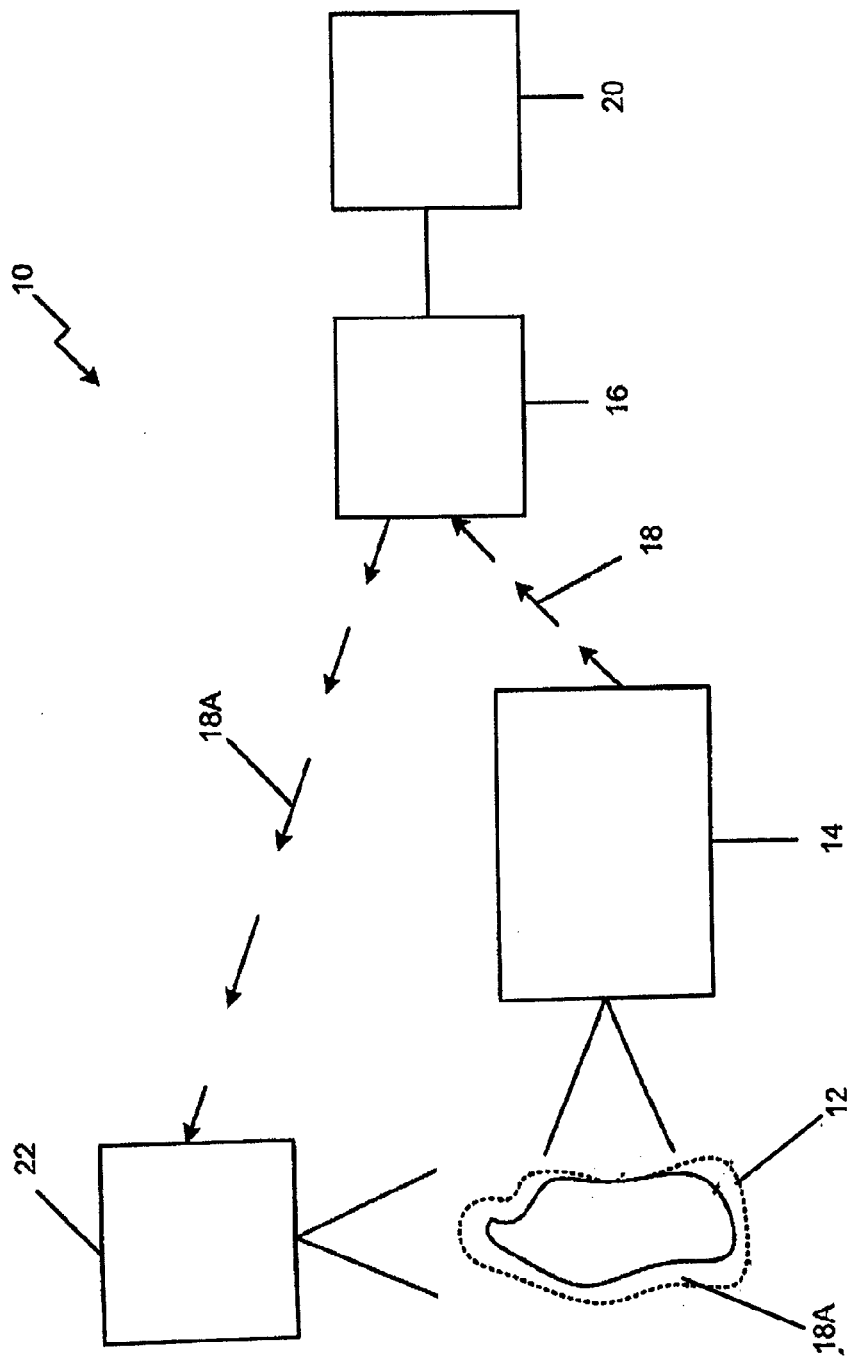
FIG. 3 is an illustration of a block diagram of a system for remote rework imaging for a part inconsistency, in accordance with one of the present disclosure.

FIG. 3 is a block diagram of a system 10 for remote rework imaging for a part inconsistency 12, in accordance with one embodiment of the present disclosure. "Inconsistency", as the term is used in the appropriate context throughout this disclosure, refers to the difference and/or out of tolerance between one or more measured characteristics of a part or structure under test and/or examination (and potentially effected by exposure to factor(s) including, but not limited to, thermal load(s), moisture, galvanic action, structural load(s), lightning, or electrical arcing) with expected values for the same characteristics of an analogous structure within tolerance and/or unaffected by exposure to those factors. "Rework" as the term is used in the appropriate context throughout this disclosure refers to changing and/or adjusting an out of tolerance condition to a condition within tolerance.

The system 10 contains a nondestructive inspection device 14. A programmable device 16 for viewing and editing images is in communication with the nondestructive inspection device 14 as described below. An image 18 of a part inconsistency 12 is communicated from the nondestructive inspection device 14 and edited on the programmable device 16. An input device 20 is in communication with the programmable device 16. The input device 20 is useful for editing images 18 on the programmable device 16. A laser projector 22 is in communication with the programmable device 16. The laser projector 22 is local to the part or structure under tests. The edited image 18A is projected from the laser projector 22 onto the part inconsistency 12.

The nondestructive inspection device 14 could be any of a number of known inspection devices, including ultrasonics, eddy current, x-ray, magnetic resonance, and microwave. Yet other known nondestructive inspection devices also advantageously may be used. The requirements on the nondestructive inspection device 14 are that it is capable of inspecting the condition of a part or structure and produce an image 18 of the same. The nondestructive inspection device 14 is in communication with the programmable device 16. The communication is such that the image 18 is communicated from the nondestructive inspection device 14 to the programmable device 16. The image 18 may be communicated by wireless or wired connection, through a network, through a portable disk or stick or other memory device that may be used to transport an image file, or any combination of the above.

The programmable device 16 may be a personal computer, laptop, personal digital assistant, or any other electronic device that can be used to view and edit the image 18 received from the nondestructive inspection device 14. The programmable device 16 may include or be attached to an input device 20. The input device 20 may include a mouse, digital pen, wand, touch screen, keyboard, or any other electronic device compatible with the programmable device 16 that may be useful for editing the image 18 received from the nondestructive inspection device 14. The programmable device 16 may be attached to, integral with, or at least in communication with a display device 24 for viewing the image 18. A purpose of editing the image 18 may include providing rework instructions and/or details for reworking the part inconsistency 12. For example, an engineer may receive the image 18 on a programmable device 16 and use the input device 20 to edit the image 18 to detail the location of one or more injection holes for injecting resin into the part inconsistency 12. A technician or laborer may use the edited image 18A to rework the part inconsistency 12.

The laser projector 22 is in communication with the programmable device 16. The communication must be such that the edited image 18A is communicable from the programmable device 16 to the laser projector 22. The edited image 18A may be communicated by wireless or wired connection, through a network, through a portable disk or stick or other memory device that may be used to transport an image file, or any combination of the above. The laser projector 22 may then be used to project the edited image 18A onto a part inconsistency 12. A technician or laborer may use the edited image 18A to rework the part inconsistency 12. The engineer responsible for detailing the edited image 18A may be located remotely relative to the part inconsistency 12 while still directing rework of the same.

Figure 4:
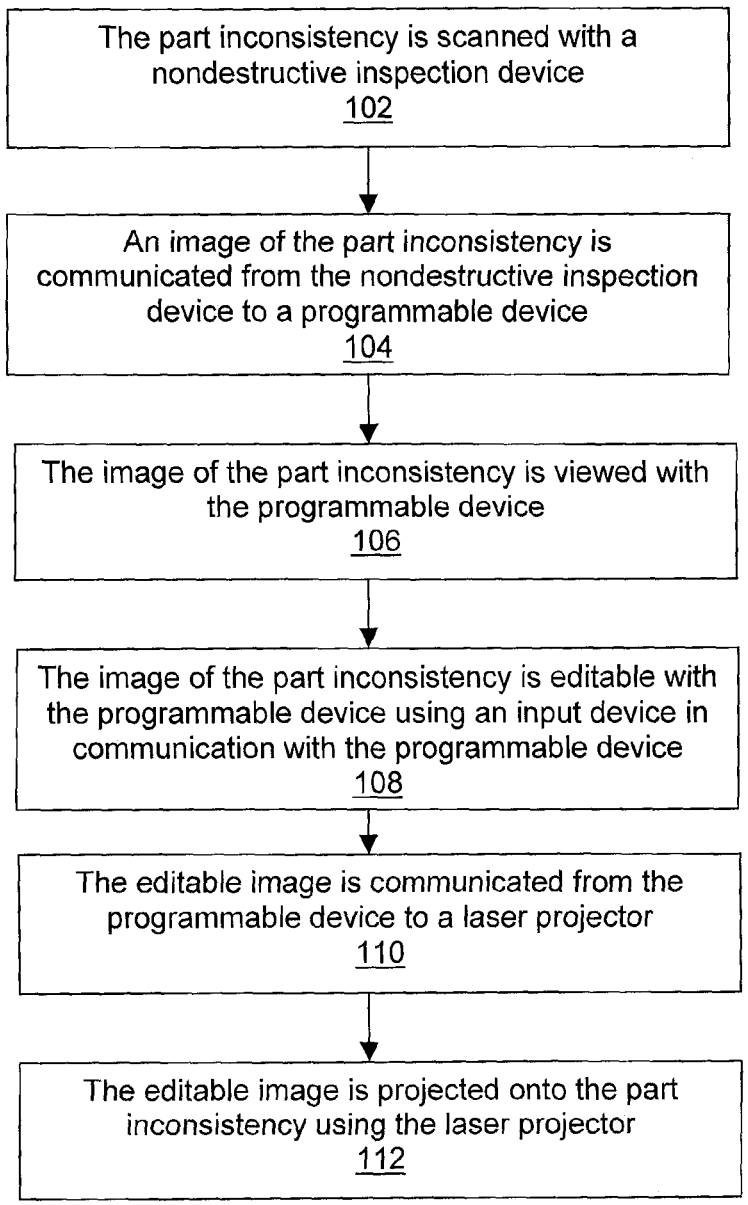
FIG. 4 is a flowchart illustrating the method in accordance with the embodiment of FIG. 3.

FIG. 4 is a flowchart 100 illustrating a method of remote rework imaging for a part inconsistency 12, in accordance with a first embodiment of the present disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved.

As is shown by block 102, a part is scanned for inconsistency 12 with a nondestructive inspection device 14. An image 18 of the part inconsistency 12 is communicated from the nondestructive inspection device 14 to a programmable device 16 (block 104). The image 18 of the part inconsistency 12 is viewed with the programmable device 16 (block 106). The image 18 of the part inconsistency 12 is edited with the programmable device 16 using an input device 20 in communication with the programmable device 16 (block 108). The edited image 18A is communicated from the programmable device 16 to a laser projector 22 (block 110). The edited image 18A is projected onto the part inconsistency 12 using the laser projector 22 (block 112).

Figure 5:
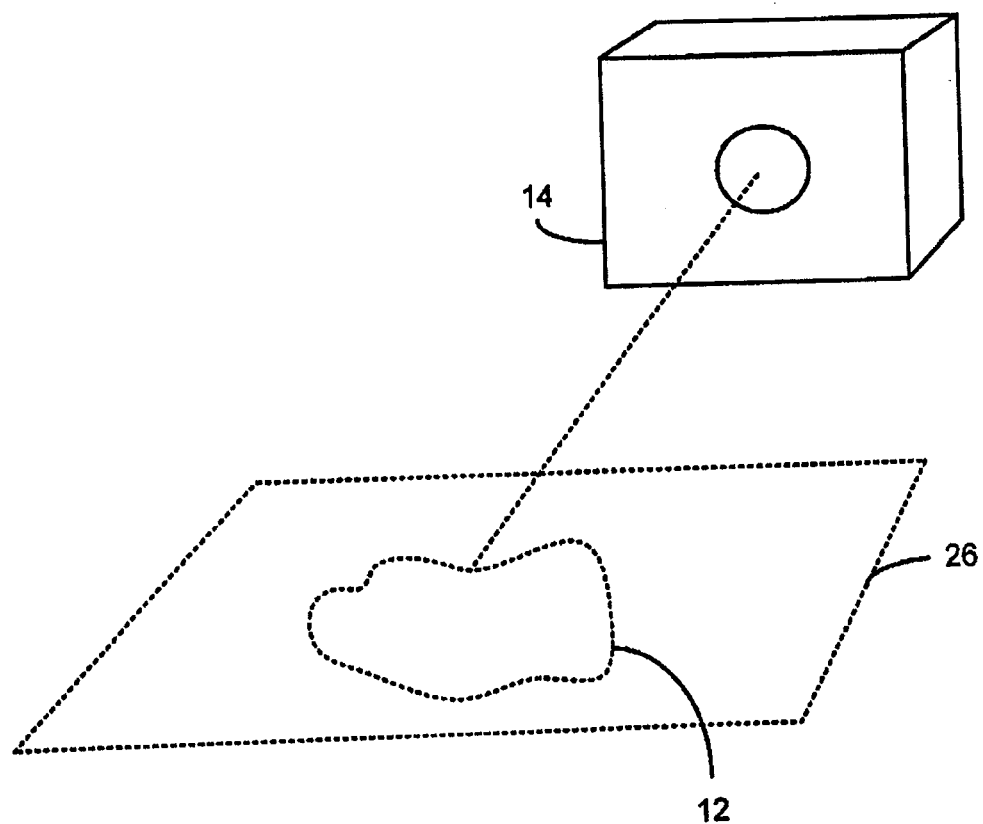
FIG. 5 is an illustration of the projector of data from a scan of a part inconsistency being scanned with a nondestructive inspection device, in accordance with the embodiment of FIG. 3.

FIG. 5 is an illustration of the projection of data from a scan of a part inconsistency 12 being scanned with a nondestructive inspection device 14, in accordance with the first embodiment of the present disclosure. A part fragment 26 is shown being scanned in FIG. 3, but the part inconsistency 12 may be found in a pre-construction part or in a fully constructed machine or device.

Figure 6:
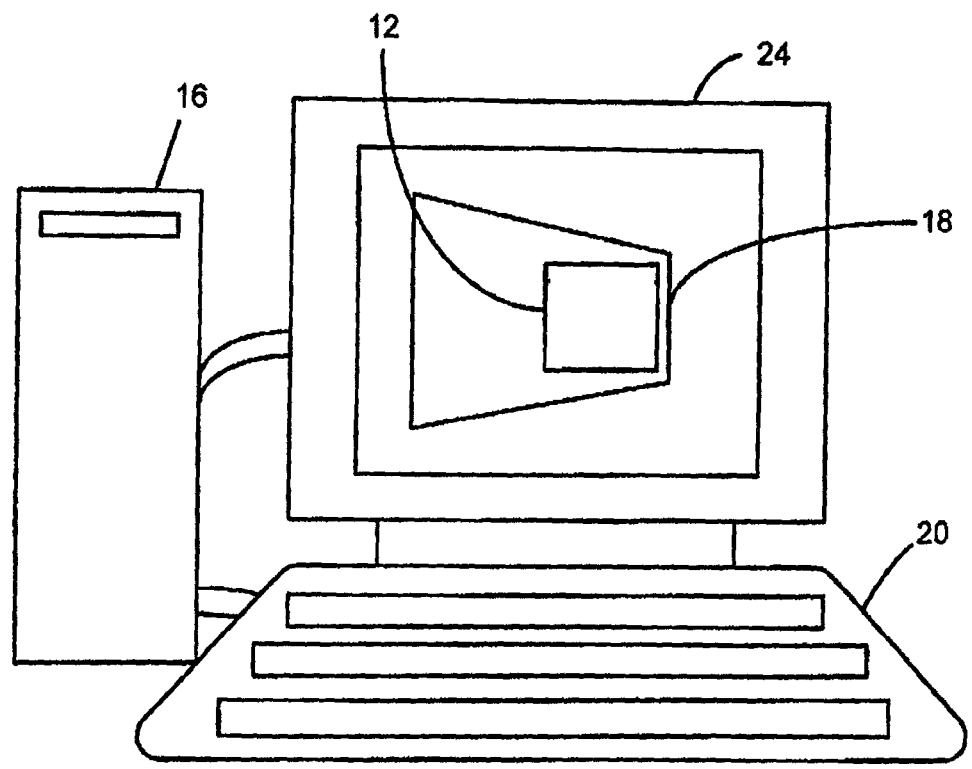
FIG. 6 is an illustration of an image of the part inconsistency of FIG. 5 viewed using a programmable device, in accordance with the embodiment of FIG. 3.

FIG. 6 is an illustration of an image 18 of the part inconsistency 12 of FIG. 5 viewed using a programmable device 16. The programmable device 16 is connected to a display device 24 for viewing the image 18 and an input device 20 for editing the image 18. The programmable device 16 shown in FIG. 6 is a personal computer, but could be a personal computer, laptop, personal digital assistant, or any other electronic device that can be used to view and edit the image 18 received from the nondestructive inspection device 14. The programmable device 16 may include image editing software for editing the image 18.

Figure 7:
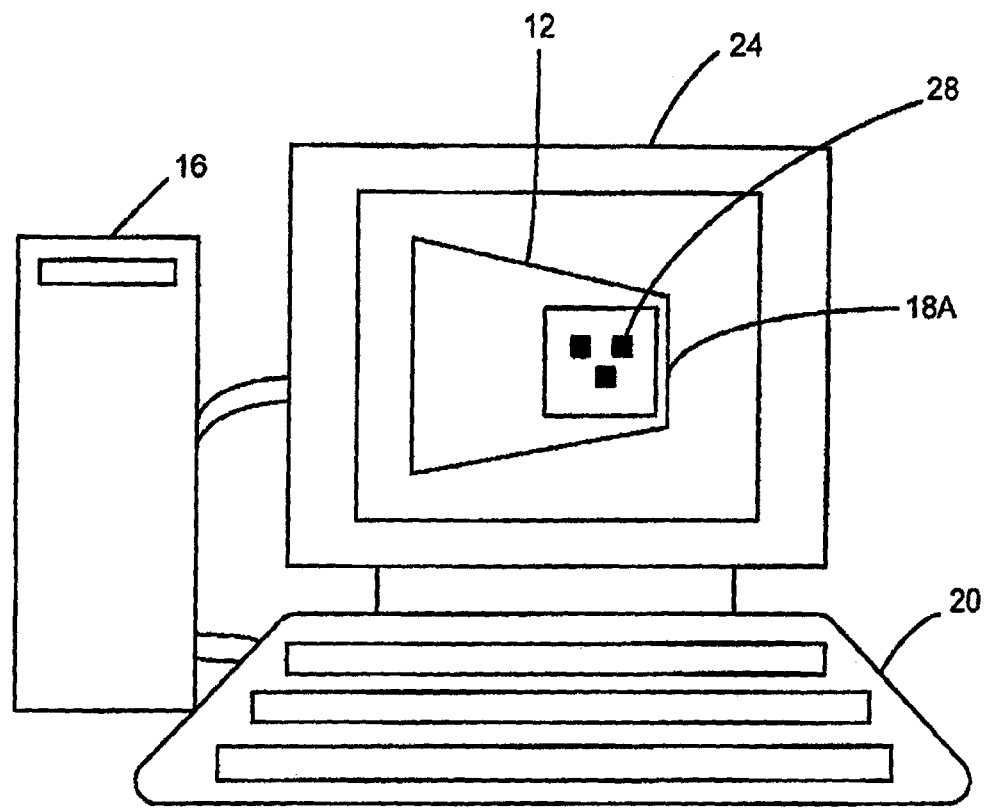
FIG. 7 is an illustration of an edited image of the part inconsistency of FIG. 5 viewed using the programmable device, in accordance with the embodiment of FIG. 3.

FIG. 7 is an illustration of an edited image 18A of the part inconsistency 12 of FIG. 5 viewed using the programmable device 16, in accordance with the first embodiment. The difference between the image 18 shown in FIG. 6 and the edited image 18A shown in FIG. 7 is the inclusion of injection locations 28 edited onto the image 18. The injection locations 28 may identify locations on the part inconsistency 12 where resin may be injected. While the rework referenced herein has been by resin injection, any rework that may be required to resolve a part inconsistency or other fault that may be identified with the nondestructive inspection device 14 may be edited onto the image 18 to form the edited image 18A.

Figure 8:
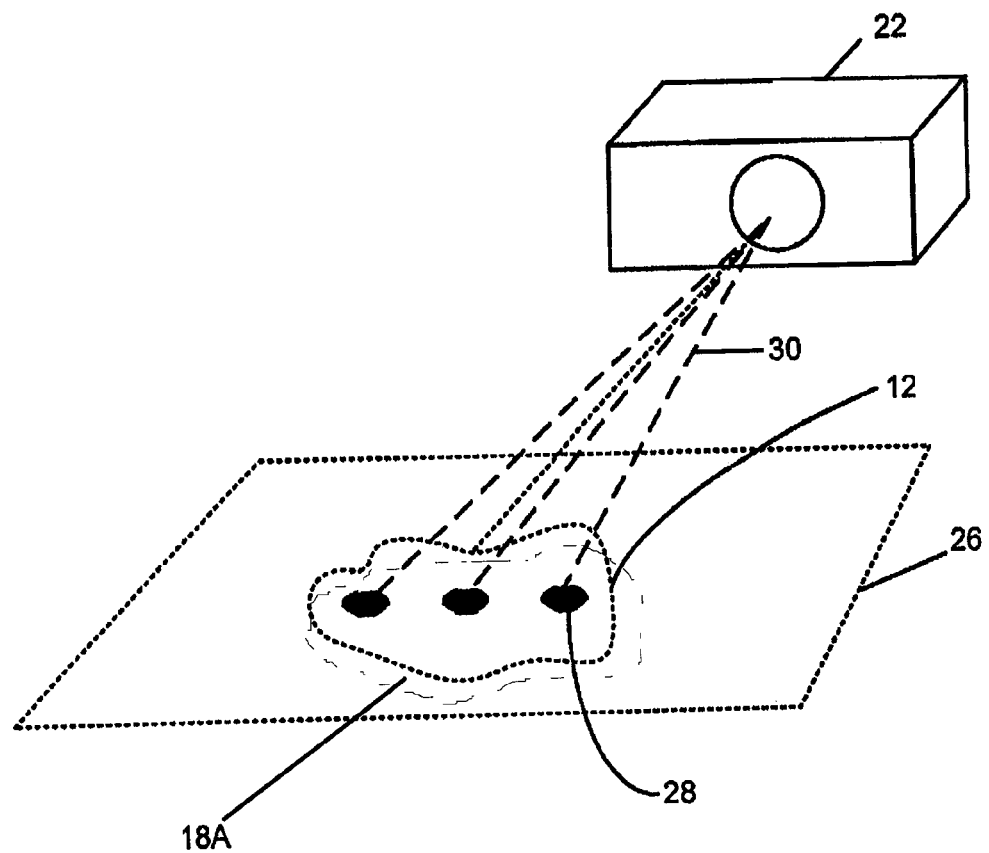
FIG. 8 is an illustration of the edited image of FIG. 7 projected onto the part fragment with a laser projector, in accordance with the embodiment of FIG. 3.

FIG. 8 is an illustration of the edited image 18A of FIG. 5 projected onto the part fragment 26 with a laser projector 22, in accordance with the first embodiment of the present disclosure. The laser projector 22 may be any commercially available product that is capable of receiving the edited image 18A from the programmable device 16 and reproducing the edited image 18A on the part fragment 26 using emitted radiation 30. The emitted radiation 30 should operate on a visible wavelength. The edited image 18A projected onto the part inconsistency 12 may include, as shown in the first exemplary embodiment, injection locations 28. A technician may use the projected injection locations 28 to identify where to make injections of resin or a similar substance. The edited image 18A may also include notes or details that identify the material to be injected, a depth at which to make the injection, a volume of material to be injected, and/or any other information that may be useful to a technician reworking a part inconsistency 12.

Figure 9:
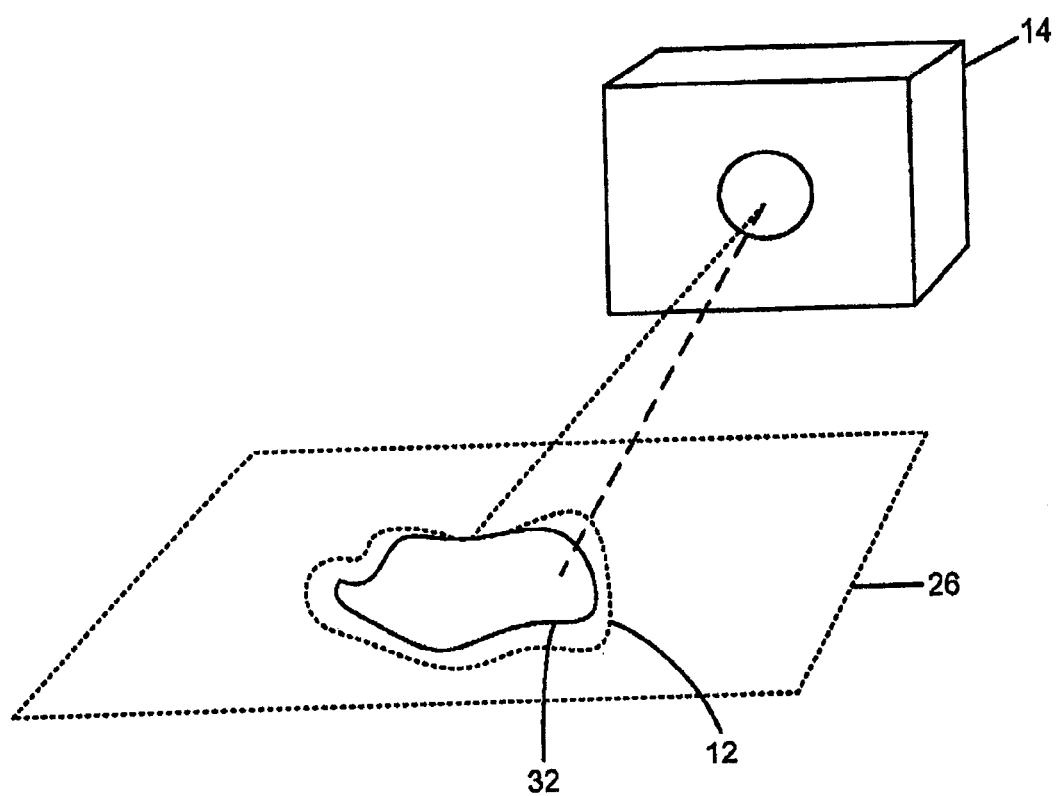
FIG. 9 is an illustration of the projection of data from a re-scan of a part inconsistency being rescanned with the nondestructive inspection device, in accordance with another embodiment of the present disclosure.
Figure 10:
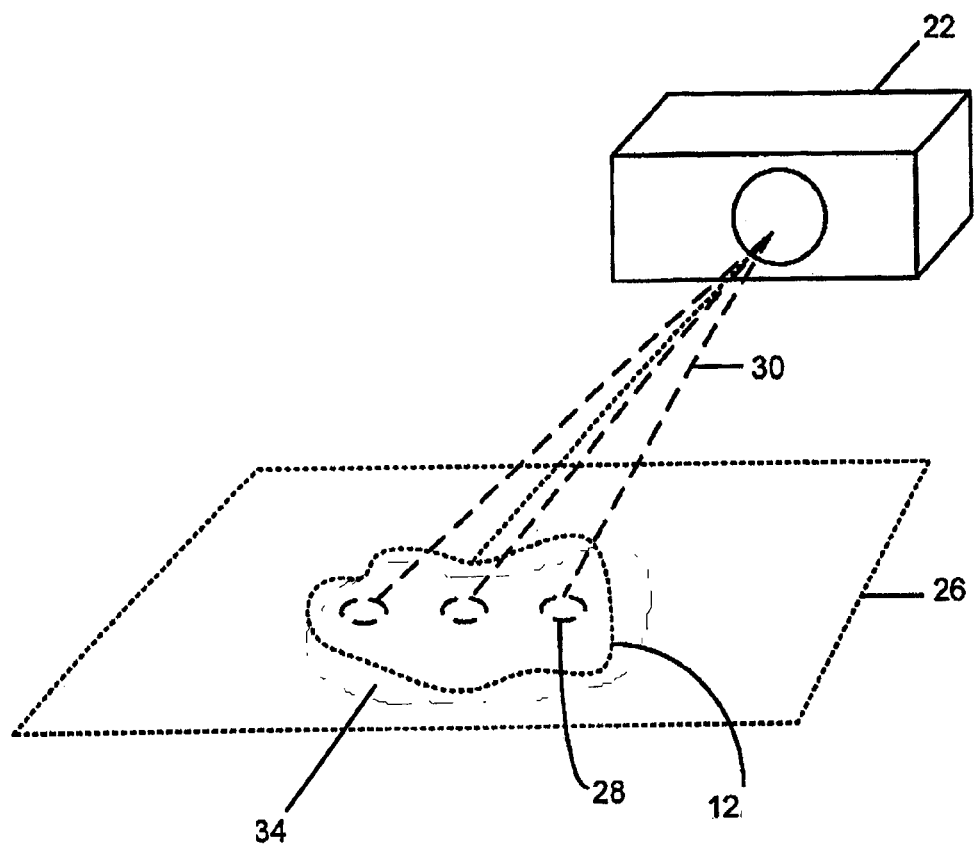
FIG. 10 is an illustration of a second edited image projected onto the part fragment of FIG. 9 with a laser projector, in accordance with the embodiment of FIG. 9.

FIG. 9 is an illustration of the projection of data from a re-scan of a part inconsistency 12 of FIG. 8 being rescanned with the nondestructive inspection device 14, in accordance with a second embodiment of the present disclosure. Once the part inconsistency 12 is reworked, the part inconsistency rework area 32 may be rescanned using the nondestructive inspection device 14. The second scan may be used to verify the rework to the part inconsistency 12 was effective and the part fragment 26 is usable. If the second scan shows the rework was insufficient to correct the part inconsistency 12, a second image produced by the second scan may be reviewed at the same or another programmable device 16. The second scan may be viewed with an overlay of the edited image 18A to determine why the first rework was insufficient and/or to identify a second rework respecting the injection locations 28 of the first rework.

FIG. 8 is an illustration of a second edited image 34 projected onto the part fragment 26 of FIG. 7 with a laser projector 22, following the second scan. The second edited image 34 may provide instruction to rework the part inconsistency 12. The second edited image 34 may also include injection locations 28 from the first rework to inform/remind the technicians of the work previously performed on the part inconsistency 12.

The image 18 may be scanned using recognizable and repeatable data points to allow the edited image 18 to be projected in substantially the same location. The image 18 may be scanned using aircraft coordinates or may be translated into aircraft coordinates after scanning. The injection locations 28 may be located using aircraft coordinates so that the rework is performed with precision. The image 18 may also be scanned using one or more reference points. The reference points may be retained within the image 18 to allow the edited image to be projected in substantially the same location. The reference points may include a seam of an object.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described disclosure without departing substantially from the spirit and principles thereof. All such modifications and variations are intended to be included herein within the scope of this disclosure and protected by the following claims.

What is claimed is:

1. A method for rework imaging of a part for an inconsistency, said method comprising the steps of:
   scanning the part for an inconsistency with a nondestructive inspection device;
   communicating an image of the part inconsistency from the nondestructive inspection device to a programmable device;
   viewing the image of the part inconsistency with the programmable device;
   editing the image of the part inconsistency with the programmable device using an input device in communication with the programmable device;
   projecting the edited image onto the part inconsistency using a visible wavelength of radiation;
   rescanning the part for an inconsistency after initially reworking the part inconsistency;
   producing a second image from rescanning the part; and
   editing the second image, wherein the second edited image provides instruction to rework the inconsistency.

2. The method of claim 1, including the step of communicating the edited image from the programmable device to a laser projector.

3. The method of claim 2, wherein the step of communicating the edited image further comprises communicating the edited image through a network from the programmable device to the laser projector.

4. The method of claim 1, wherein the step of scanning comprises scanning the part inconsistency with an ultrasonic device.

5. The method of claim 1, wherein the second edited image includes injection locations from the first rework.

6. A method for rework imaging of a part for an inconsistency, said method comprising the steps of:
- scanning the part for an inconsistency with a nondestructive inspection device;
- communicating an image of the part inconsistency from the nondestructive inspection device to a programmable device;
- viewing the image of the part inconsistency with the programmable device;
- editing the image of the part inconsistency with the programmable device using an input device in communication with the programmable device;
- projecting the edited image onto the part inconsistency using a visible wavelength of radiation, wherein the part is scanned using one or more reference points and wherein the reference points are retained within the edited image;
- rescanning the part for an inconsistency after initially reworking the part inconsistency; producing a second image from rescanning the part; and
- editing the second image, wherein the second edited image provides instruction to rework the inconsistency.

7. The method of claim 6, including the step of communicating the edited image from the programmable device to a laser projector.

8. The method of claim 7, wherein the step of communicating the edited image further comprises communicating the edited image through a network from the programmable device to the laser projector.

9. The method of claim 6, wherein the step of scanning comprises scanning the part inconsistency with an ultrasonic device.

10. The method of claim 6, wherein the second edited image includes injection locations from the first rework.

11. A method for rework imaging of a part for an inconsistency, said method comprising the steps of:
- scanning the part for an inconsistency with a nondestructive inspection device;
- communicating an image of the part inconsistency from the nondestructive inspection device to a programmable device;
- viewing the image of the part inconsistency with the programmable device;
- editing the image of the part inconsistency with the programmable device using an input device in communication with the programmable device; and
- projecting the edited image onto the part inconsistency using a visible wavelength of radiation, wherein the part is scanned using one or more reference points and wherein the reference points are retained within the edited image.

12. The method of claim 11, including the step of communicating the edited image from the programmable device to a laser projector.

13. The method of claim 12, wherein the step of communicating the edited image further comprises communicating the edited image through a network from the programmable device to the laser projector.

14. The method of claim 11, wherein the step of scanning comprises scanning the part inconsistency with an ultrasonic device.

* * * * *